United States Patent [19]

Charles et al.

[11] 4,280,846
[45] Jul. 28, 1981

[54] METHOD OF FABRICATION OF DIELECTRIC MATERIAL HAVING VOLUME-DISTRIBUTED INSULATING BARRIERS FOR USE AT HIGH VOLTAGES AND A CERAMIC BODY FABRICATED BY SAID METHOD

[75] Inventors: Eliane Charles; Mieczyslaw Hildebrandt; Francois Buchy, all of Paris, France

[73] Assignee: Thomson-CSF, Paris, France

[21] Appl. No.: 61,407

[22] Filed: Jul. 27, 1979

[30] Foreign Application Priority Data

Aug. 1, 1978 [FR] France ............................... 78 22734

[51] Int. Cl.³ ...................... C04B 35/50; C04B 35/49
[52] U.S. Cl. ................................ 106/73.2; 106/73.31; 264/61; 264/66
[58] Field of Search .............. 264/61, 65, 66; 252/63, 252/63.5, 63.2; 106/39.6, 39.8, 73.31, 73.2

[56] References Cited

U.S. PATENT DOCUMENTS

| | | | |
|---|---|---|---|
| 2,946,752 | 7/1960 | Jonker et al. | 264/66 |
| 2,989,477 | 6/1961 | Eckert | 264/66 |
| 3,027,327 | 3/1962 | Blank | 264/61 |
| 3,055,832 | 9/1962 | Weisz | 264/66 |
| 3,274,110 | 9/1966 | Getto | 264/65 |
| 3,291,739 | 12/1966 | Deschamps | 264/65 |
| 3,600,484 | 8/1971 | Smoke et al. | 264/65 |

FOREIGN PATENT DOCUMENTS

| | | |
|---|---|---|
| 1547278 | 11/1968 | France . |
| 2376500 | 12/1977 | France . |
| 849938 | 9/1960 | United Kingdom . |
| 964726 | 7/1964 | United Kingdom . |
| 1436586 | 5/1976 | United Kingdom . |
| 1479004 | 7/1977 | United Kingdom . |

Primary Examiner—Donald J. Arnold

[57] ABSTRACT

A mixture of oxides or salts of barium, titanium and tin (principal materials) are initially ground with two different classes of dopants. The first class consists of oxides or salts of rare earths or of elements such as antimony. The second class consists of oxides or salts of elements such as manganese or copper. After calcining and sintering, cooling of the ceramic body is obtained by adjusting to a very low rate (negative gradient of 10 to 30° C. per hour) in a pure oxygen atmosphere.

The material is primarily suited for use in capacitors having one or a number of layers which may be separated by electrodes inserted prior to sintering. The material has high apparent permittivity and can be employed at much higher voltages than in barrier-layer capacitors.

8 Claims, 4 Drawing Figures

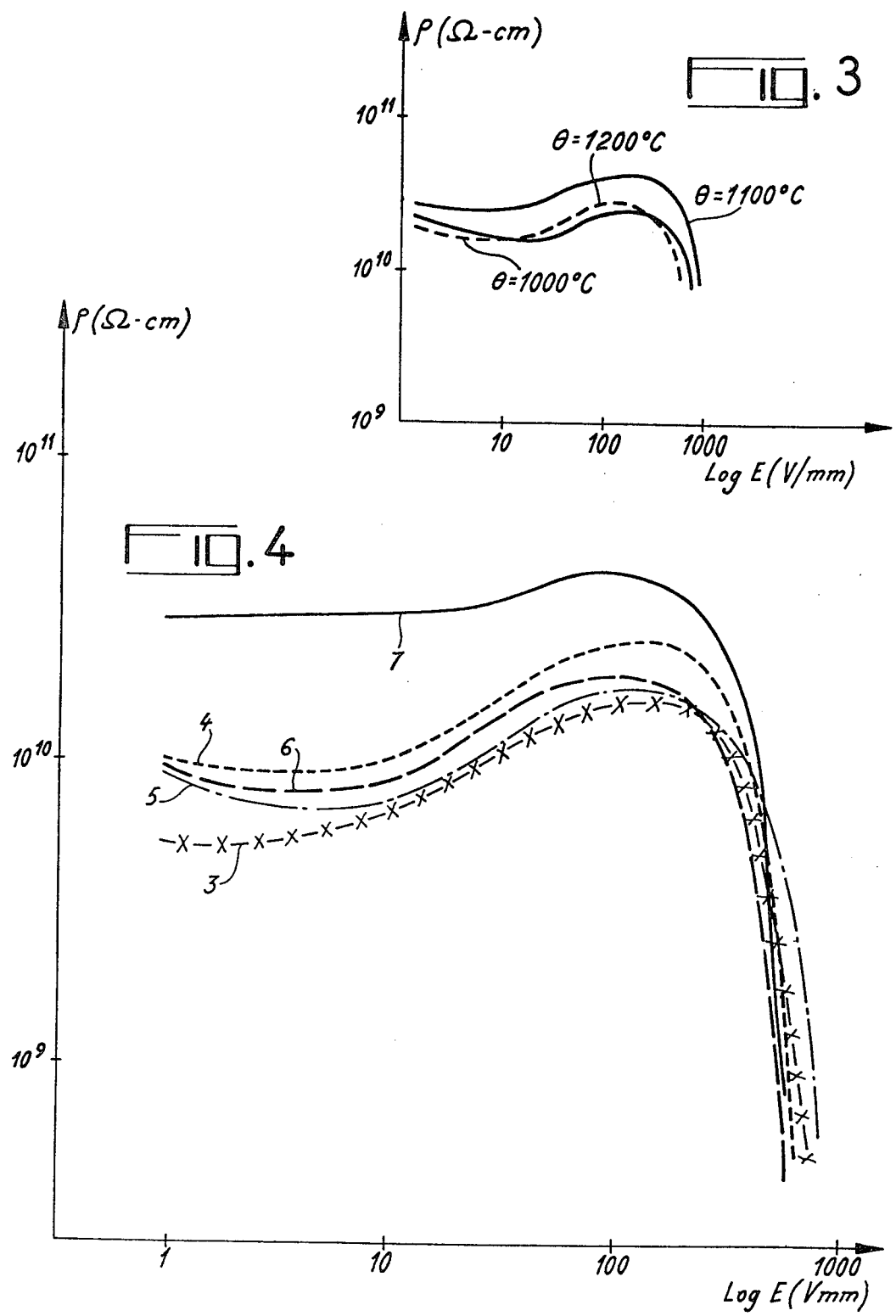

METHOD OF FABRICATION OF DIELECTRIC MATERIAL HAVING VOLUME-DISTRIBUTED INSULATING BARRIERS FOR USE AT HIGH VOLTAGES AND A CERAMIC BODY FABRICATED BY SAID METHOD

This invention relates to a method of fabrication of dielectric material of the type comprising insulating barriers distributed within the mass of material, having high apparent permittivity and variable resistivity as a function of the mean value of the electric field established within the material. The invention is also concerned with a ceramic substance produced by this method.

One type of capacitor which is already known is the so-called barrier-layer capacitor which is remarkable for a very high apparent relative permittivity (20,000 to 200,000) of the dielectric (or partially dielectric) material which forms a separation between the capacitor plates.

It is known that the method of fabrication from titanium oxide and barium carbonate involves two successive heat treatments, namely a first treatment in a hydrogen or pure nitrogen atmosphere at a temperature within the range of 800° C. to 1450° C., and a second treatment in an oxidizing atmosphere at a temperature within the range of 700° C. to 1400° C. The characteristics obtained by this method are as follows:

apparent relative permittivity of the order of 100,000;
tangent of the loss angle: maximum of 5% (at a measuring frequency of 1 kHz);
very high resistivity ($10^{10}$ ohm-cm) at a voltage of 1 volt across electrodes separated by a thickness of material equal to 0.8 mm (namely a mean electric field of 1.25 V/mm) but falling very sharply above a voltage of 15 to 30 volts (mean electric field of 18 to 40 V/mm).

Another type of capacitor which is already known is the so-called volume-distributed insulating-barrier capacitor which is characterized by slightly lower apparent relative permittivity (20,000 to 30,000) but the resistivity of which remains higher than $10^{10}$ ohm/cm above a mean electric field of the order of 200 V/mm. It is known that the method of fabrication of such capacitors involves successive heat treatments, in one case starting from a mixture of barium and titanium oxides to which is added a low percentage of rare-earth oxide, this treatment being carried out in a pure nitrogen atmosphere at a temperature of approximately 1300° C. and, in the other case, after addition of powdered copper oxide at a temperature of 1250° C.

It is finally a known practice to make use of a dielectric material having an apparent relative permittivity of the order of 50,000 and high dielectric strength under conditions of use in which it is subjected to a mean electric field of 100 V/mm. Apart from drying of raw materials ground by wet process, the method of fabrication of this material involves only a single heat treatment at a temperature within the range of 1300° C. to 1400° C., starting from a powder constituted by a mixture of barium carbonate, oxides of titanium, raw materials containing calcium, strontium, zirconium and/or tin and finally of two different doping substances, one of which is antimony oxide, for example, and the other is copper oxide.

The invention makes it possible to obtain a material of the volume-distributed insulating-barrier type which has an apparent relative permittivity exceeding that of conventional capacitors and a resistivity which can exceed $10^{10}$ ohm-cm in respect of a mean internal electric field which is either equal to or higher than 200 V/mm.

In accordance with the invention, there is provided a method of fabrication of dielectric material of the volume-distributed insulating-barrier type in which the starting materials are constituted by a mixture of powders of oxides and salts in the following proportions:

1-x moles of $BaCO_3$;
x moles of $CaCO_3$ or $SrCO_3$ or $PbCO_3$ or $MgCO_3$ or another salt of Ca, Sr, Pb, Mg which can readily be decomposed under the action of heat;
z (1-y) moles of $TiO_2$;
z y moles of $SnO_2$ or $ZrO_2$ or $SiO_2$;

with the following conventions:

$0 < x < 0.5$
$0 < y < 0.5$
$1 < z < 1.1$

The initial mixture further consists on the one hand of oxides or salts of rare earths or of elements having a valence of 3 or 5 in a quantity by weight representing 15 to 30 per ten thousand of the total weight of moles of BaO and of $TiO_2$ contained in the initial mixture and, on the other hand, of oxides or salts of copper, manganese, cobalt or iron in a quantity by weight representing 5 to 15 per ten thousand of the total weight of moles of BaO and of $TiO_2$ contained in the mixture. Said method further comprises the following operations:

(a) grinding;
(b) heat treatment by calcining;
(c) further grinding;
(d) shaping of the material by pressing or casting;
(e) heat treatment by sintering in accordance with a temperature curve comprising a rising portion, a level-temperature stage and a falling portion; the rising portion and the level-temperature stage take place in atmospheric air, the temperature of the level stage being within the range of 1330° C. to 1380° C.; during the falling-temperature stage at a rate below 50° C. per hour, the operation is carried out in an oxidizing atmosphere starting from a temperature which is lower than the level-stage value by 0° C. to 300° C.

Further advantages will become apparent from the following description which will serve to gain a more complete understanding of the invention, reference being made to the accompanying drawings in which:

FIGS. 2, 3 and 4 represent similar curves in the case of materials according to the invention.

Figure 1:
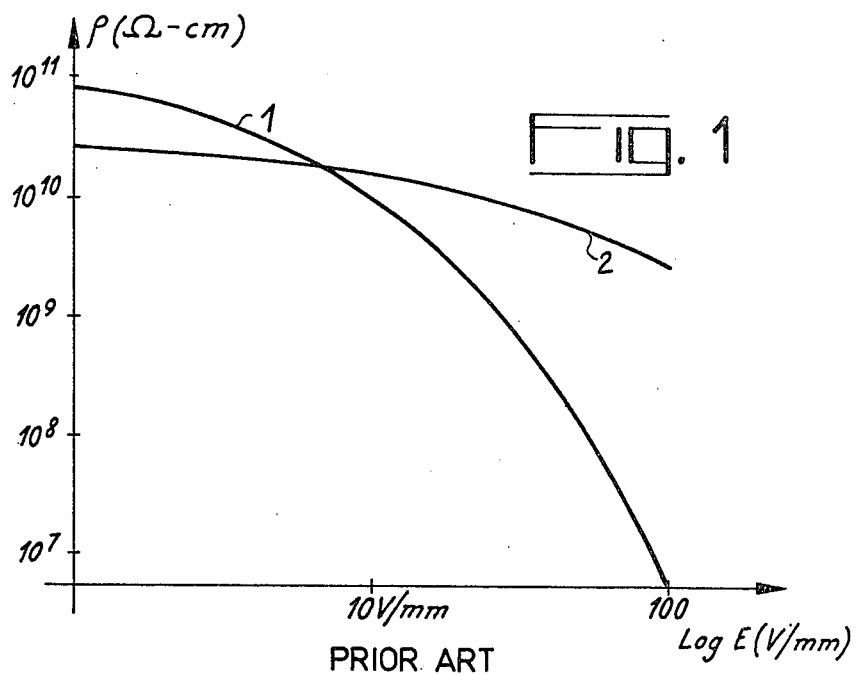
FIG. 1 represents a curve of resistivity as a function of the electric field within a known material.

In a first exemplified embodiment of the invention, the following values are chosen for the parameters, x, y and z:

x=0
y=0.2
z=1.04.

The oxides or salts are $BaCO_3$, $TiO_2$ and $SnO_2$ in the case of the principal materials and $Sb_2O$, and CuO in the case of the dopants, the respective proportions of dopants being 25 and 9 per ten thousand of the total weight of (BaO+$TiO_2$) contained in the raw materials.

By way of example, the quantities of oxides or of salts are as follows in respect of a total weight (BaO+$TiO_2$) of 50 grams:

$BaCO_3$: 39.431 g
$TiO_2$: 13.436 g

SnO$_2$: 6.019 g

Sb$_2$O$_3$: 0.125 g (proportion of 0.25%)

CuO: 0.045 g (proportion of 0.09%)

The operations take place as follows:

(a) a first grinding operation is carried in an aqueous medium (demineralized water) or in a liquid in which the raw materials are not too readily dissolved, the grinding operation being performed over a period of one half-hour to one hour in an attrition grinding mill containing zirconium oxide balls;

(b) calcining of the powder thus obtained is effected by maintaining the powder in a furnace for a period of two hours at a temperature of 1050° C. or, by way of alternative, for a period of 1 to several hours at a temperature within the range of 950° C. to 1250° C.;

(c) a second grinding operation is carried out under conditions which are similar to those of the first grinding operation;

(d) shaping takes place under a pressure of 0.5 to 1 t/cm$^2$ either by pressing of the so-called isostatic type or by pressing in a mold after incorporation of a binder (the binder being removed by heating after the shaping operation). The desired parts are thus obtained either directly or in the form of a cylinder which is cut, for example, into discs of small thickness (1 mm, for example);

(e) a sintering treatment takes place under the following conditions within a furnace in which it is possible either to allow circulation of atmospheric air or to operate in an atmosphere produced by a circulation of gas such as pure oxygen, for example. The treatment comprises:

a rising temperature gradient (linear variation of temperature as a function of time) within the range of 100° C. to 500° C. per hour (300° C./hr, for example);

a level-temperature stage within the range of 1330° C. to 1380° C. (1350° C., for example) during a period of 0.5 to 5 hours (one hour, for example);

a falling temperature gradient (linear variation of temperature as a function of time) within the range of 10° C. to 50° C. per hour (30° C. per hour, for example);

an atmosphere consisting of atmospheric air during the rising temperature gradient, the level-temperature stage and the beginning of the falling temperature gradient; this is immediately followed by a supply of pure oxygen at a flow rate of 0.5 to 5 liters per minute which is injected into the furnace in the immediate vicinity of the parts to be sintered. By way of example, a flow rate of 1 liter per minute has been adopted in practice, the oxygen being fed into a tubular furnace having a diameter of 60 mm.

The measured characteristics in four cases have been recorded in Table I. These characteristics correspond to the introduction of pure oxygen, starting from the temperatures indicated in each case.

TABLE I

| Measured characteristics | 1st case (1350° C.) | 2nd case (1200° C.) | 3rd case (1100° C.) | 4th case (1000° C.) |
|---|---|---|---|---|
| Resistivity in ohm-cm (in respect of E = 1 V/mm) | 1.4 × 10$^9$ | 7.7 × 10$^9$ | 1.1 × 10$^{10}$ | 1.2 × 10$^{10}$ |
| Maximum resistivity (value of E) | | 1.5 × 10$^{10}$ (100 V/mm) | 2 × 10$^{10}$ (60 V/mm) | 2 × 10$^{10}$ (100 V/mm) |
| Permittivity (in respect of E = 1 V/mm) | 31500 | 38900 | 45850 | 38800 |
| Tangent of loss angle (in respect of E = 1 V/mm) | 8.4 × 10$^{-2}$ | 5.4 × 10$^{-2}$ | 5.8 × 10$^{-2}$ | 5.4 × 10$^{-2}$ |

A comparison is made hereinafter between the results of measurements of resistivity on materials derived from the first example with the results of dielectric materials of a conventional type.

In FIG. 1, the logarithm of the electric field E in V/mm has been plotted as abscissae and the logarithm of the resistivity in ohm-cm has been plotted as ordinates. Curves 1 and 2 represent the results obtained in the case of two conventional materials having different compositions. It is noted that, even in the case of curve 1 (namely the most favorable case), the resistivity begins to fall to a value below 10$^{10}$ ohm-cm well before the electric field approaches the value of 100 V/mm.

Figure 2:
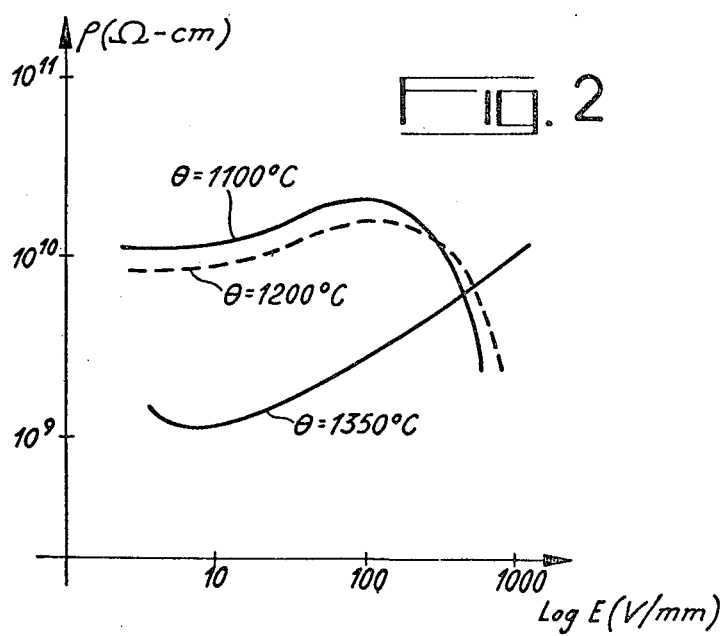

In FIG. 2, the curves of resistivity obtained in respect of three samples of material corresponding to the first three cases of Table I has been plotted as coordinates which are similar to those of FIG. 1. It is observed that, in all three cases, the resistivity increases when the electric field increases from 10 V/mm to higher values with a maximum in the vicinity of 60 or 100 V/mm in the third and second cases and without interruption in the first case (temperature: 1350° C.).

In a second example, the same values have been chosen for the parameters x, y and z with the same salts or oxides as principal materials but with Sb$_2$O$_3$ and Mn$_2$O$_3$ as dopants, in the following proportions:

0.25% Sb$_2$O$_3$, namely 0.125 g;

0.06% MnCO$_2$, namely 0.030 g.

Table II below gives the values of the characteristics in three cases which are similar to those of Table I.

TABLE II

| Measured characteristics | 1st case (1200° C.) | 2nd case (1100° C.) | 3rd case (1000° C.) |
|---|---|---|---|
| Resistivity (Ω . cm) (in respect of E = 1 V/mm) | 1.9 × 10$^{10}$ | 2.4 × 10$^{10}$ | 2.1 × 10$^{10}$ |
| Maximum resistivity (value of E) | 3.1 × 10$^{10}$ (100 V/mm) | 4.04 × 10$^{10}$ (150 V/mm) | 2.5 × 10$^{10}$ (150 V/mm) |
| Permittivity (in respect of E = 1 V/mm | 27600 | 25700 | 24550 |
| Tangent of loss angle (in respect of E = V/mm) | 5 × 10$^{-2}$ | 4.9 × 10$^{-2}$ | 4.7 × 10$^{-2}$ |

The curves of resistivity corresponding to these three cases are represented in FIG. 3.

The observations are similar to those made with reference to the three last cases of Table I.

In other examples, the mixture of starting materials which has been chosen corresponds to compositions determined by the choice of parameters appearing in the following table.

TABLE III

| No. of Example | x | y | z | Proportion of Sb₂O₃ | Proportion of CuO | Proportion of MnCO₃ |
|---|---|---|---|---|---|---|
| 3 | 0 | 0.2 | 1.07 | 0.25% | 0.09% | 0 |
| 4 | 0 | 0.2 | 1.07 | 0.25% | 0.067 | 0.007 |
| 5 | 0 | 0.2 | 1.07 | 0.25% | 0.045 | 0.015 |
| 6 | 0 | 0.2 | 1.07 | 0.25% | 0.022 | 0.022 |
| 7 | 0 | 0.2 | 1.07 | 0.25 | 0 | 0.03 |

Sintering took place under the following conditions, the previous steps being identical with those of the first example and of the second example:

rate of temperature rise: 300° C./hour
time duration of level-temperature stage at 1350° C.: 1 hour
rate of decrease in temperature: 30° C./hour with introduction of pure oxygen (1 liter per minute), starting from the temperature of 1100° C. until complete cooling.

The characteristics measured on samples obtained in Examples 3 to 7 are summarized in Table IV below:

TABLE IV

| Measured characteristics | No of Examples | | | | |
|---|---|---|---|---|---|
| | 3 | 4 | 5 | 6 | 7 |
| Resistivity in ohm-cm (in respect of E = 1 V/mm) | $6.1 \times 10^9$ | $1.05 \times 10^{10}$ | $1 \times 10^{10}$ | $1.2 \times 10^{10}$ | $3.5 \times 10^{10}$ |
| Maximum resistivity (value of E) | $2.1 \times 10^{10}$ (150 V/mm) | $2.3 \times 10^{10}$ (100 V/mm) | $2 \times 10^{10}$ (130 V/mm) | $3.1 \times 10^{10}$ (100 V/mm) | $5.2 \times 10^{10}$ (63 V/mm) |
| Permittivity (in respect of E = 1 V/mm) | 43900 | 42145 | 40800 | 34000 | 28700 |
| Tangent of loss angle (in respect of E = 1 V/mm) | 5.4% | 5.8% | 5.3% | 5.5% | 5.7% |

In FIG. 4, the five curves numbered from 3 to 7 represent the resistivities of the materials obtained in Examples 3 to 7.

It can be seen that the resistivity of these materials is higher than $10^{10}$ over a wide range of utilization, especially in respect of electric field values exceeding 100 V/mm.

In regard to the quantities of dopants of the second category, it has been observed that results comparable with those of Examples 3 to 7 are obtained by adopting weights of copper oxide and of manganese carbonate such that the aggregate weight does not exceed 5 to 15 per ten thousand of the total weight of BaO and of $TiO_2$.

By employing the material according to the invention, it is possible to fabricate electric capacitors having relatively high electrostatic capacitance with respect to their volume and a relatively high operating voltage.

This material is also well suited to the fabrication of film-type capacitors made up of a number of layers (separated or not) for electrodes constituted by metallic film-layers deposited prior to sintering.

As has been noted from the description of the examples illustrated in FIGS. 2, 3 and 4, the curve of resistivity of the material according to the invention as a function of the electric field to which it is subjected comprises at least one rising portion.

What is claimed is:

1. A method of fabrication of a dielectric material of the volume-distributed insulating-barrier type, wherein the starting materials are constituted of a powdered mixture of oxides and salts in the following proportions:

1-x moles of $BaCO_3$;
x moles of $CaCO_3$, $SrCO_3$, $PbCO_3$ or $MgCO_3$ or another salt of Ca, Sr, Pb or Mg which can readily be decomposed under the action of heat;
z (1-y) moles of $TiO_2$;
z y moles of $SnO_2$, $ZrO_2$ or $SiO_2$; wherein
$0 < x < 0.5$
$0 < y < 0.5$
$1 < z < 1.1$, the initial mixture further comprising at least one oxide or salt of a rare earth element or element having a valence of 3 to 5 in a quantity by weight representing 15 to 30 per ten thousand of the total weight of moles of BaO and of $TiO_2$ contained in the initial mixture and at least one oxide or salt of copper, manganese, cobalt or iron in a quantity by weight representing 5 to 15 per ten thousand of the total weight of moles of BaO and of $TiO_2$ contained in the mixture, said method comprising:

(a) grinding;
(b) heat treatment by calcining;
(c) further grinding;
(d) shaping of the material by pressing or casting; and
(e) heat treatment by sintering following a temperature curve comprising a rising portion, a level-temperature stage and a falling portion, the rising portion and the level-temperature stage occurring in atmospheric air, the temperature of the level stage being within the range of 1330° C. to 1380° C., the operation being conducted in a substantially oxygen containing atmosphere during the falling-temperature stage which occurs a rate below 50° C. per hour, starting from a temperature which is lower than the level-stage value by 0° C. to 300° C.

2. The method of claim 1, wherein the rare earth element is dysprosium, lanthanum, neodymium and/or ytterbium, and said element having a valence of 3 or 5 is bismuth, antimony or niobium.

3. The method of claim 1 or 2, wherein said powdered mixture is calcined at a temperature in the range of 950° C. to 1250° C. for a period of one to several hours, said gradient of the rising portion of the temperature curve in step (e) during the sintering operation being within the range of 100° C. to 500° C. per hour, the duration of the level-temperature stage in step (e) being within the range of one-half hour to five hours, the gradient of the falling portion of the temperature curve in step (e) being with the range of 10° C. to 50° C. per hour, and the transition from atmospheric air to said substantially oxygen containing atmosphere in step (e)

occurring at a temperature which is less than the level-temperature stage by 100° C. to 200° C.

4. The method of claim 1, wherein said starting materials are $BaCO_3$, $TiO_2$ and $SnO_2$ whose quantities are determined by the values: $x=0$, $y=0.2$ and $z=1.04$.

5. The method of claim 4, wherein the initial mixture contains the oxide $Sb_2O_3$ in a proportion of 0.25% of the total molar weight of BaO and of $TiO_2$ of the initial mixture and the copper oxide CuO in a proportion of 0.09% of the total molar weight of BaO and of $TiO_2$ of the initial mixture.

6. The method of claim 1, wherein the initial mixture contains a weight $P_1$ of copper oxide CuO and a weight $P_2$ of manganese carbonate $MnCo_3$ such that the total weight P of oxide and of salt does not exceed 5 to 15 per ten thousand of the total weight of moles of BaO and of $TiO_2$ contained in the mixture.

7. A ceramic body prepared by a process comprising:
  (a) grinding raw materials constituted of a powdered mixture of oxides and salts in the following proportions:
    1-x moles of $BaCO_3$;
    x moles of $CaCO_3$, $SrCO_3$, $PbCO_3$ or $MgCO_3$ or another salt of Ca, Sr, Pb, or Mg which can readily be decomposed under the action of heat;
    z(1-y) moles of $TiO_2$;
    z y moles of $SnO_2$, $ZrO_2$ or $SiO_2$; wherein
    $0<x<0.5$
    $0<y<0.5$
    $1<z<1.1$,
    the initial mixture further comprising at least one oxide or salt of a rare earth element or an element having a valence of 3 or 5 in a quantity by weight representing 15 to 30 per ten thousand of the total weight of moles of BaO and of $TiO_2$ contained in the initial mixture and at least one oxide or salt of copper, manganese, cobalt or iron in a quantity by weight representing 5 to 15 per ten thousand of the total weight of moles of BaO and of $TiO_2$ contained in the mixture;
  (b) heat treatment by calcining;
  (c) further grinding said calcined material;
  (d) shaping said material by pressing or casting; and
  (e) heat treatment by sintering following a temperature curve comprising a rising portion, a level-temperature stage and a falling portion, the rising portion and the level-temperature stage occurring in atmospheric air, the temperature of the level stage being within the range of 1330° C. to 1380° C., the operation being conducted in a substantially oxygen containing atmosphere during the falling-temperature stage which occurs at a rate less than 50° C. per hour, starting from a temperature which is less than the level-stage value by 0° C. to 300° C.; said ceramic body having the characteristic that the curve of variation in resistivity of said ceramic body as a function of the electric field to which said body is subjected has at least one rising portion.

8. The ceramic body of claim 7, whose resistivity exceeds $10^{10}$ ohm-cm with respect to a mean internal electric field at least equal to 200 V/mn.

* * * * *

UNITED STATES PATENT AND TRADEMARK OFFICE
CERTIFICATE OF CORRECTION

PATENT NO. : 4,280,846
DATED : July 28, 1981
INVENTOR(S) : ELIANE CHARLES ET AL

It is certified that error appears in the above-identified patent and that said Letters Patent are hereby corrected as shown below:

Column 3, Table 1, last line, please delete the figures "(100", "(60 V/mm)" and "(100".

Column 4, Table 1 continued, line 6, please delete the figures "V/mm)" and "V/mm)";

please insert under 2nd case --(100 V/mm)--, under 3rd case --(60 V/mm)--, and under 4th case --(100 V/mm)--.

Signed and Sealed this

Second Day of March 1982

[SEAL]

Attest:

GERALD J. MOSSINGHOFF

Attesting Officer    Commissioner of Patents and Trademarks